United States Patent [19]

Futami

[11] Patent Number: 5,193,498
[45] Date of Patent: Mar. 16, 1993

[54] HYDRAULIC TENSIONER HAVING INTEGRALLY FORMED MOUNTING PLATE AND GASKET

[75] Inventor: Yuichi Futami, Iruma, Japan
[73] Assignee: Tsubakimoto Chain Co., Osaka, Japan
[21] Appl. No.: 830,136
[22] Filed: Jan. 31, 1992

[30] Foreign Application Priority Data

Jan. 31, 1991 [JP] Japan .................. 3-8490

[51] Int. Cl.⁵ .................. F16H 7/12; F16H 7/08
[52] U.S. Cl. .................. 123/90.31; 474/110
[58] Field of Search .......... 123/90.31; 474/110, 474/104, 91, 206, 212

[56] References Cited

U.S. PATENT DOCUMENTS

| | | | |
|---|---|---|---|
| 4,276,038 | 6/1981 | Kraft | 474/110 |
| 4,413,982 | 11/1983 | Foster | 474/110 |
| 4,454,236 | 6/1984 | Foster et al. | 474/110 |
| 4,521,208 | 6/1985 | Doveri | 123/90.31 |
| 5,033,423 | 7/1991 | Diard | 123/90.31 |
| 5,073,150 | 12/1991 | Shimaya | 474/206 |
| 5,087,225 | 2/1992 | Futami et al. | 474/91 |
| 5,090,946 | 2/1992 | Futami et al. | 474/104 |
| 5,109,813 | 5/1992 | Trzmiel et al. | 123/90.31 |
| 5,116,284 | 5/1992 | Cho | 474/110 |

Primary Examiner—E. Rollins Cross
Assistant Examiner—M. Macy
Attorney, Agent, or Firm—Howson & Howson

[57] ABSTRACT

An hydraulic tensioner using engine lubricating oil as its operating fluid is mountable on an engine block by a mounting plate serving both as a mounting adapter and as a closure for an oil reservoir opening in the tensioner housing. A gasket between the tensioner housing and the mounting plate prevents leakage of oil from the reservoir. To facilitate installation of the three-part assembly consisting of the tensioner, the mounting plate and the gasket, the three elements are temporarily secured together before mounting to enable the installer to handle the three elements easily with one hand. The temporary assembly of the three elements together also reduces the likelihood of damage to the gasket. Separate rivets, or bosses formed in the gasket, can be used to hold the elements together before mounting.

4 Claims, 8 Drawing Sheets

HYDRAULIC TENSIONER HAVING INTEGRALLY FORMED MOUNTING PLATE AND GASKET

BRIEF SUMMARY OF THE INVENTION

This invention relates to hydraulic tensioners of the type having oil reservoirs. More particularly, the invention relates to improvements which facilitate mounting of the tensioner on a part of an associated machines, for example an engine block.

A typical tensioner to which this invention is applicable is a hydraulic tensioner of the kind used to maintain tension in the camshaft drive chain of an internal combustion engine The tensioner has a piston movable in a cylinder formed in the tensioner housing. The piston has an exterior shoe engageable with a chain which transmits power from the engine crankshaft (or from an intermediate idler sprocket powered thereby) to the engine camshaft. A spring in the tensioner urges the piston-carried shoe into contact with the chain to maintain tension therein. The cylinder of the tensioner is filled with hydraulic fluid which flows freely through a check valve to permit extending movement of the piston, but flows in the opposite direction through a restricted passage so that retracting movement of the tensioner can take place only slowly.

In many tensioners of the above-described type, engine oil itself is used as the hydraulic fluid, and is supplied to the tensioner through an oil supply passage in the engine block, or other engine structure, on which the tensioner is mounted. The tensioner housing includes a reservoir having an opening which is in fluid communication with the oil supply passage. A gasket is interposed between the tensioner housing and the engine structure. This gasket extends around the periphery of the reservoir opening to prevent leakage of oil.

There are cases in which it is desired to utilize a structurally modified form of tensioner with an engine which has not been, or cannot be, correspondingly modified to fit the tensioner. Under these circumstances, the opening of the tensioner reservoir will not usually conform to the surface of the engine structure surrounding the opening of the oil supply passage, and it is therefore necessary to provide an adapter in the form of a mounting plate, between the engine structure and the tensioner housing, to cover the opening of the tensioner's reservoir. In this case, the gasket is located between the tensioner housing and the mounting plate.

When a mounting plate is used as an adapter, there are three parts to be installed on the engine structure simultaneously: the tensioner housing, the gasket and the mounting plate. The mechanic installing the tensioner will normally be holding an installation tool in one hand, and has only one hand available to hold the three parts in the proper relationship to one another and to the engine structure. Accordingly, installation is quite difficult.

The principal object of this invention is to facilitate the installation of a tensioner in those instances in which a mounting plate is used as an adapter. Another object of the invention is to reduce the likelihood of damage to the gasket during installation and deformation of the gasket during shipment and handling as well as during installation.

In accordance with the invention, means are provided for temporarily securing the mounting plate, the gasket and the tensioner housing together in a predetermined relationship to one another while the tensioner is unmounted.

With the tensioner housing, the gasket and the mounting plate assembled together before mounting on the engine structure, the mechanic can easily hold all three parts in one hand and hold the installation tool in the other hand. This arrangement not only greatly facilitates installation, but also reduces the likelihood of damage to the gasket, and prevents the gasket from being forgotten in the installation process.

Further objects, advantages and details of the invention will be apparent from the following detailed description when read in conjunction with the drawings.

DETAILED DESCRIPTION

Figure 11:
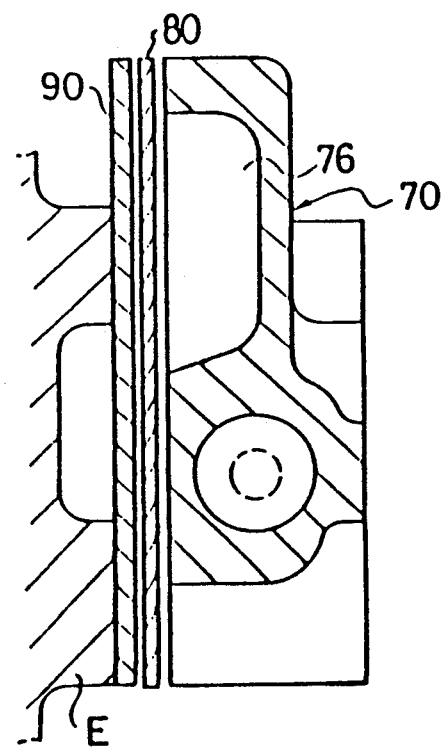
FIG. 11 is a fragmentary cross-section illustrating the installation of a tensioner using a mounting plate without the benefit of the present invention.
Figure 12:
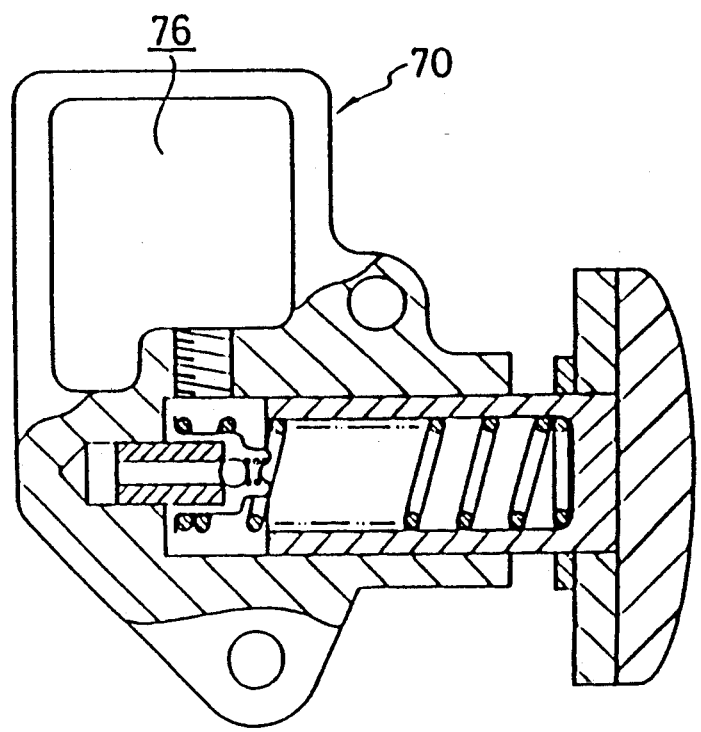
FIG. 12 is an elevational view, partly in section, showing a typical tensioner.

FIGS. 11 and 12 show a typical tensioner 70 of the type to which this invention relates. The tensioner has an oil reservoir 76, which has an opening at one face of the tensioner housing and which is adapted to communicate with an oil supply passage in an engine block E, so that the supply of oil to the tensioner is received from the lubricating system of the engine. Where the reservoir opening is not aligned with the oil supply opening in the engine structure, as is the case in FIG. 11, it is necessary to provide an adapter in the form of mounting plate 90 in order to close the opening of the reservoir. To prevent oil leakage, a gasket 80 is interposed between the tensioner housing and the mounting plate. Oil flows from the oil supply opening in the engine block to the reservoir through a passage (not shown) in the mounting plate.

As will be apparent from FIG. 11, there are three separate parts which need to be handled during the process of attachment of the tensioner to the engine block, namely the tensioner housing itself, the gasket 80 and the mounting plate 90. The attachment process is difficult because the three separate parts must be held in one hand, while the other hand holds the attachment tool.

Figure 1:
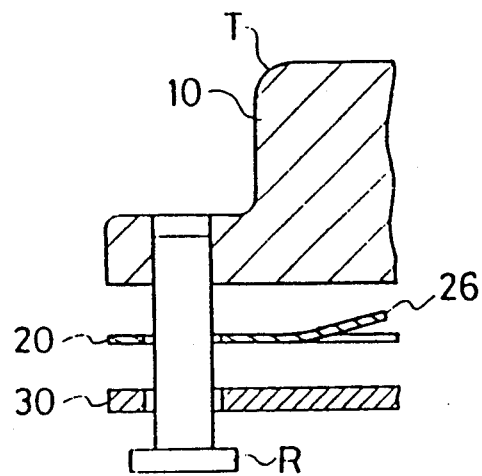
FIG. 1 is a fragmentary cross-section illustrating an assembly consisting of a tensioner housing, a gasket and a mounting plate in accordance with a first embodiment of the invention.
Figure 2:
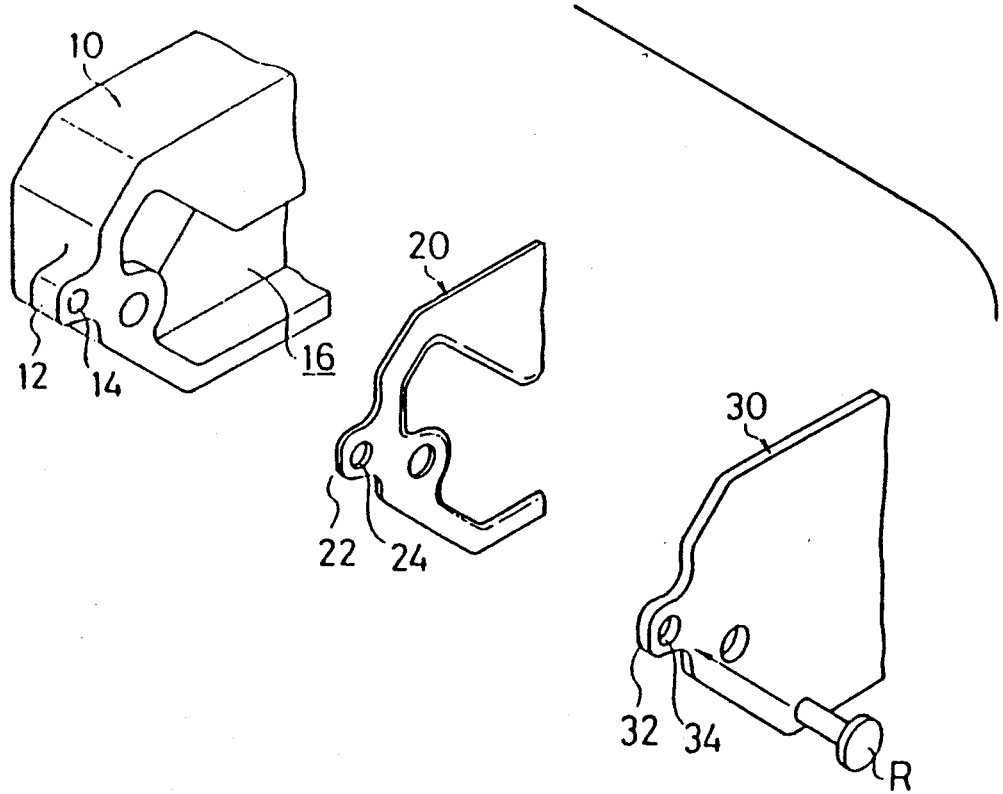
FIG. 2 is an exploded perspective view of the assembly of FIG. 1.

Referring now to FIGS. 1 and 2, tensioner T has a housing 10, underneath which there is shown a gasket 20 and a mounting plate 30. These three parts are provided with protrusions 12, 22 and 32 respectively, which overlie one another, with their through holes 14, 24 and 34 in alignment.

A rivet R, having an enlarged head, is inserted through hole 34 in the mounting plate and hole 24 of the gasket, and is weakly press fit into hole 14 in protrusion 12 of the tensioner housing, as shown in FIG. 1. The rivet temporarily holds the three parts 10, 20 and 30 together so that they can be more easily handled during installation on the engine block. The rivet can be readily replaced by an appropriate fastener when the assembly is in place against the engine block.

Gasket 26 has a so-called "spring back" portion 26. The spring-back portion extends around the interior edge of the gasket, and serves to prevent leakage of oil from oil reservoir 16 of the tensioner.

To maintain the effectiveness of the spring-back portion of the gasket, it must be protected from damage and deformation during shipping and handling. Protection is achieved by assembling the three parts together, as shown in FIG. 1, with the head of rivet R sufficiently spaced from protrusion 14 of the housing to allow gaps to exist between housing 10 and gasket 20 and between gasket 20 and mounting plate 30.

To facilitate installation of the tensioner the three parts 10, 20 and 30 are assembled as shown in FIG. 1, with their holes 14, 24 and 34 aligned coaxially on rivet R. The parts can rotate relative to one another on the axis of rivet R, but they are prevented from translational movement relative to rivet R.

Figure 3:
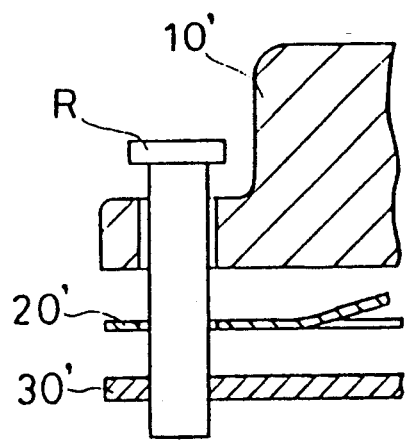
FIG. 3 is a fragmentary cross-section illustrating a second embodiment of the invention.

The assembly of FIG. 3 is similar to that of FIG. 1 except that the rivet is reversed. It extends through aligned holes in the protrusions of tensioner housing 10' and gasket 20', and is weakly press fit into the hole in the protrusion of mounting plate 30'.

Figure 4:
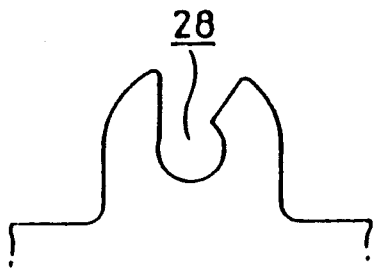
FIG. 4 is a fragmentary elevational view of a modified form of gasket.
Figure 5:
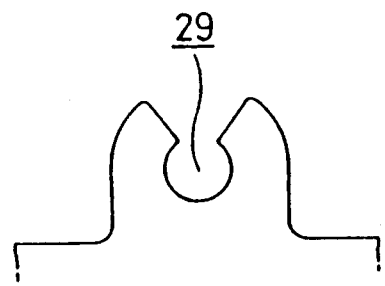
FIG. 5 is a fragmentary elevational view of another modified form of gasket.

The gaskets can have through holes corresponding to hole 24 in FIG. 2, or, alternatively, they can be formed with cut-out holes, as shown at 28 and 29 in FIGS. 4 and 5 respectively, wherein gaps in the protrusions of the gaskets extend from the circular portions of the holes to the edges of the gaskets. This allows the gaskets to be removed and replaced, while the tensioner is installed on the engine block, without completely removing the tensioner. The circular portions of the edges of the holes, as shown in FIGS. 4 and 5, extend through an arc slightly more than 180° so that the gaskets do not accidentally fall away from the rivet R, but can be easily removed for replacement.

Figure 6:
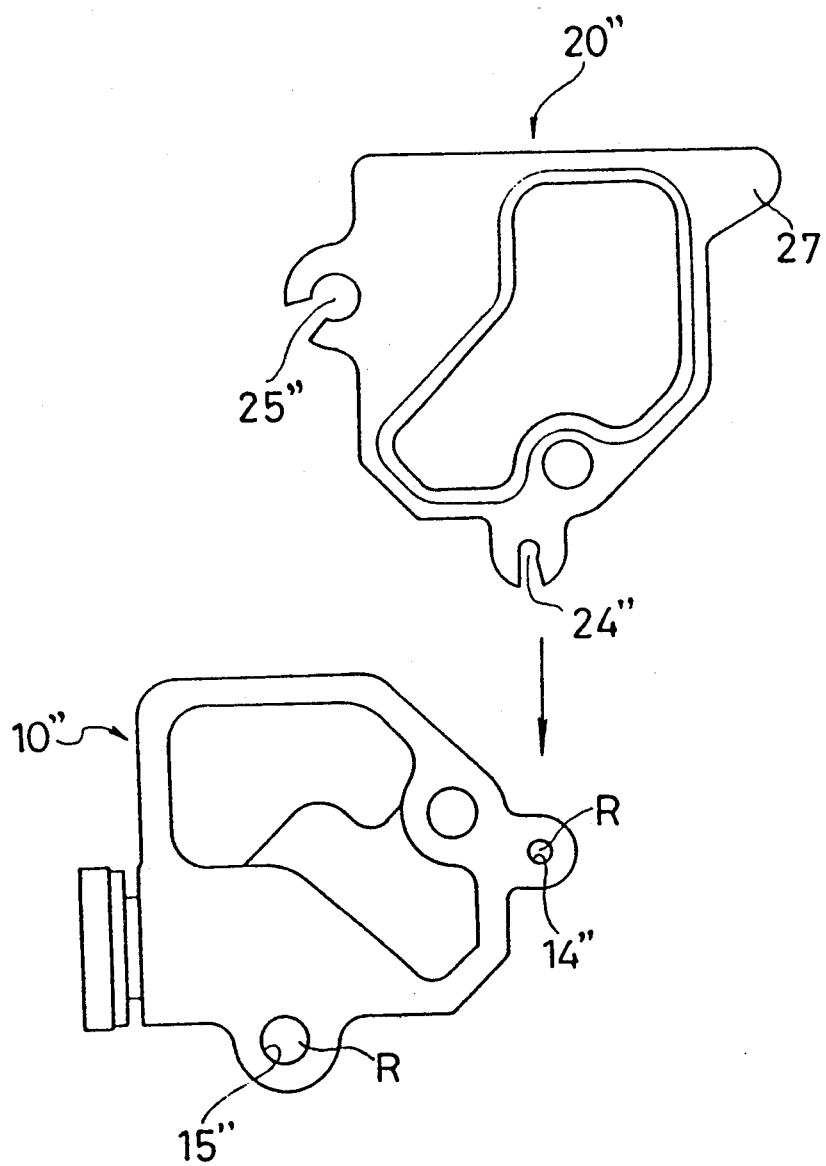
FIGS. 6, 7 and 8 are elevational views showing three stages in the process of attaching a gasket to a tensioner housing, in which the gasket is temporarily attached to the housing at two points.
Figure 7:
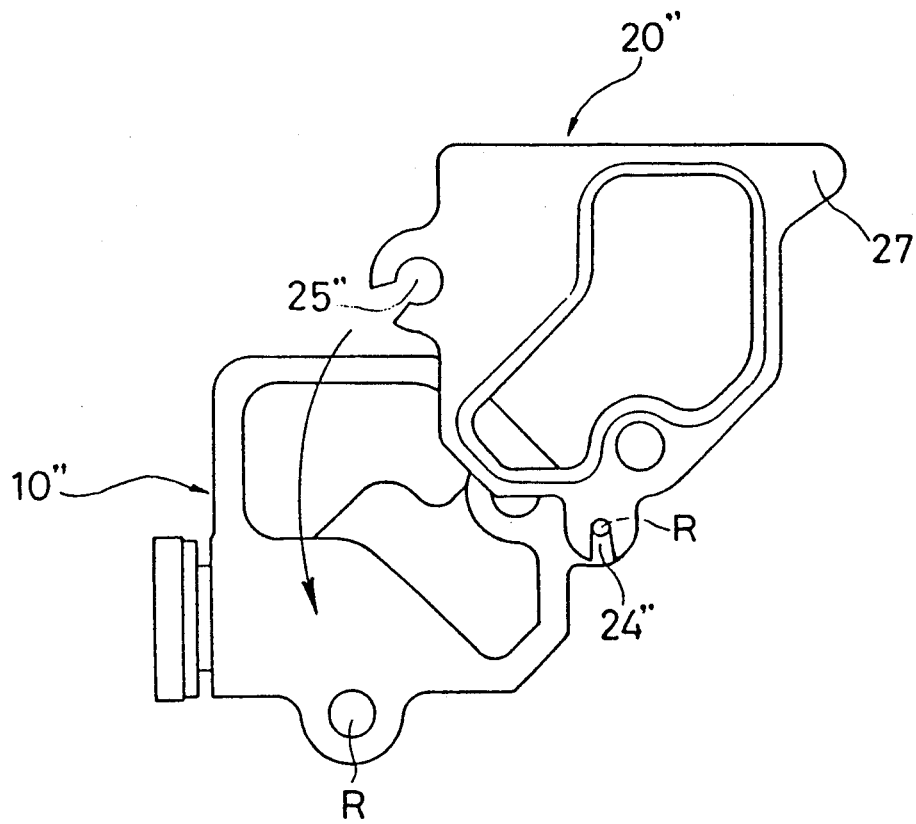
Figure 8:
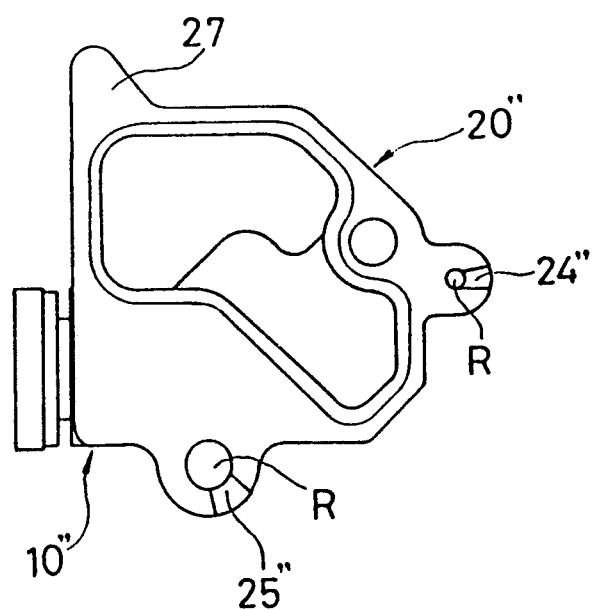

In the embodiment shown in FIGS. 6-8, gasket 20" and the mounting plate (not shown) are attached at two positions to the housing. The housing 10" has two through holes 14" and 15". Two rivets R are provided. The rivets extend through holes in the mounting plate (not shown) and are weakly press fit into holes 14" and 15" of the housing respectively, as in the embodiment of FIG. 1. Alternatively, either or both rivets can extend through a through hole in the housing and be press fit into a hole in the mounting plate, as in the embodiment of FIG. 3.

Gasket 20" has two cut-out holes 24" and 25" positioned so that they can be aligned with holes 14" and 15" respectively in the tensioner housing. The gasket can be inserted after the housing and the mounting plate are temporarily fixed together by the two rivets R. Cut-out hole 24 is engaged with the rivet in hole 14" as shown in FIGS. 6 and 7. The gasket 20" is then rotated counterclockwise as shown in FIGS. 7 and 8 so that cut-out hole 25" engages the rivet in hole 15". In this way gasket 20" is temporarily fixed by two rivets R between the tensioner housing and the mounting plate, and is held against rotation relative to the tensioner and mounting plate. The cut-out gap extending from hole 25" to the outer edge of the gasket is positioned so that rivet R in hole 15" enters the gap as the gasket rotates about the rivet in hole 14". The cut-out holes in the gasket make it possible to remove the gasket for replacement without disengaging the mounting plate from the tensioner housing. A gripping tab 27 is preferably provided on the gasket to facilitate its installation and removal.

Figure 9:
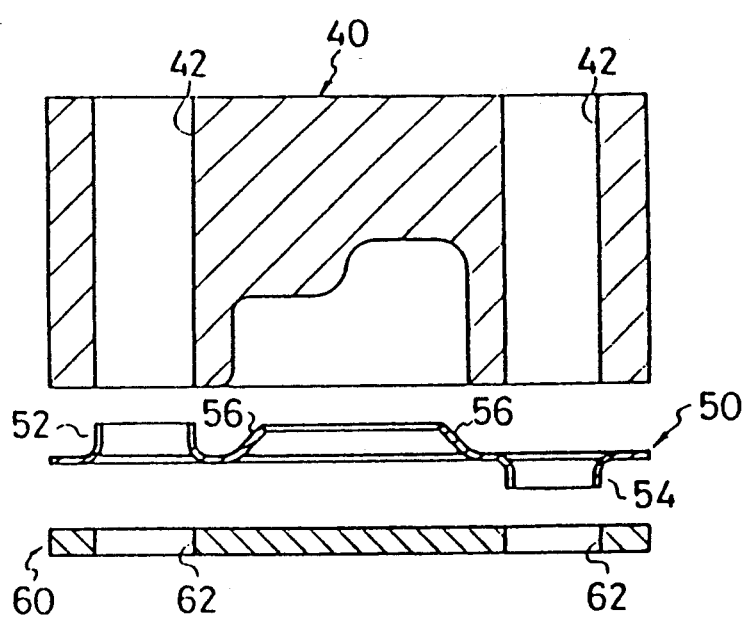
FIG. 9 is an exploded sectional view showing an alternative embodiment of the invention in which the gasket is provided with bosses for securing it temporarily to the tensioner housing and mounting plate.
Figure 10:
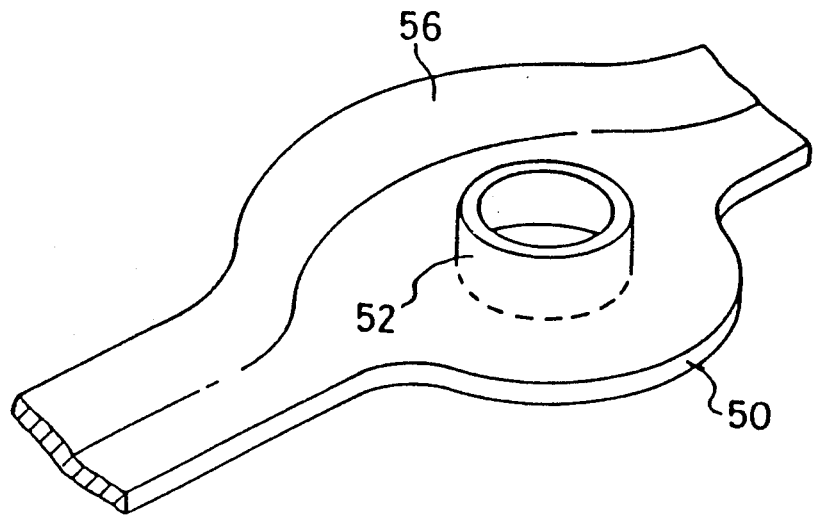
FIG. 10 is a fragmentary perspective view showing the gasket of FIG. 9.

In the embodiment shown in FIGS. 9 and 10, a gasket 50 is to be installed between a tensioner housing 40 and a mounting plate 60. Through holes 42 are provided in the housing, and corresponding through holes 62, alignable with holes 42, are provided in the mounting plate. These holes 42 and 62 allow fasteners to be inserted through the assembly for securing it to an engine block. Hollow bosses 52 and 54 project from the opposite faces of the gasket. These bosses are press-fit into through holes 42 and 62 respectively in the tensioner housing and mounting plate. The gasket is also provided with a spring-back portion 56, which engages the edge of the reservoir opening of housing 40.

With the bosses of gasket 62 press-fit into holes in the tensioner housing and mounting plate, the three elements, the tensioner, the mounting plate and the gasket are temporarily held together, and can be easily handled as a unit during installation. Installation is carried out simply by inserting fasteners, through the aligned holes 42 and 62, into mounting holes (not shown) provided in the engine block. The fasteners extend through the hollow bosses of the gasket, which remain engaged with their corresponding holes in the tensioner housing and in the mounting plate.

The temporary fastening of the tensioner housing, the mounting plate and the gasket together in accordance with any of the several embodiments described above makes it possible for the mechanic to handle the assembly easily with one hand during installation, and therefore makes installation of the tensioner much easier than was previously the case. The invention also makes it possible to package and ship the tensioner, gasket and mounting plate in their temporarily assembled condition in order to reduce the likelihood of damage to, or deformation of, the gasket, especially its spring-back portion. When the three parts are temporarily mounted on a single rivet, they can be rotated relative to each other during installation. By using two or more rivets, the parts can be temporarily fixed together against both relative rotation and relative translation.

Various modifications can be made to the several embodiments described above. For example, more than one rivet can be provided in the embodiments of FIGS. 1 and 3. The cut-out gasket openings in the embodiment of FIGS. 6-8 can face in the same direction so that the gasket can be installed by a translational movement rather than by translation followed by rotation. Other modifications can be made to the assembly described without departing from the scope of the invention as defined in the following claims.

I claim:

1. A hydraulic tensioner for a flexible power transmission, said tensioner mountable on an engine structure, said tensioner comprising a housing element including a hydraulic fluid reservoir having an opening, means providing a mounting plate element for covering the opening of said reservoir and for at least partially supporting said housing element on said engine structure, a gasket for providing a seal at the periphery of said opening, between said mounting plate element and said housing element, and means temporarily securing said mounting plate element, said gasket and said housing element together in a predetermined relationship to one another while said tensioner is unmounted.

2. A hydraulic tensioner according to claim 1 in which said housing element, said mounting plate element and said gasket are secured together in said predetermined relationship to one another while said tensioner is unmounted, with a gap between said gasket and at least one of said housing and mounting plate elements.

3. A hydraulic tensioner according to claim 1 including a shaft having an axis, and in which said housing element, said mounting plate element and said gasket are held together on said shaft so as to prevent radial movement relative to the axis of said shaft.

4. A hydraulic tensioner according to claim 2 including a shaft having an axis, and in which said housing element, said mounting plate element and said gasket are held together on said shaft so as to prevent radial movement relative to the axis of said shaft.

* * * * *